W. C. FOWLER.
REGISTER.
APPLICATION FILED DEC. 1, 1917.

1,260,658.

Patented Mar. 26, 1918.
3 SHEETS—SHEET 1.

Inventor
Walter C Fowler

By _____
Attorney

W. C. FOWLER.
REGISTER.
APPLICATION FILED DEC. 1, 1917.

1,260,658.

Patented Mar. 26, 1918.
3 SHEETS—SHEET 2.

Inventor
Walter C. Fowler

W. C. FOWLER.
REGISTER.
APPLICATION FILED DEC. 1, 1917.
1,260,658.
Patented Mar. 26, 1918.
3 SHEETS—SHEET 3.
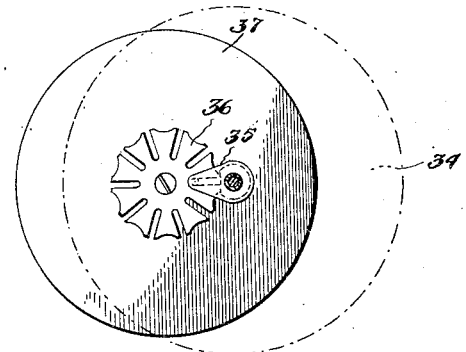
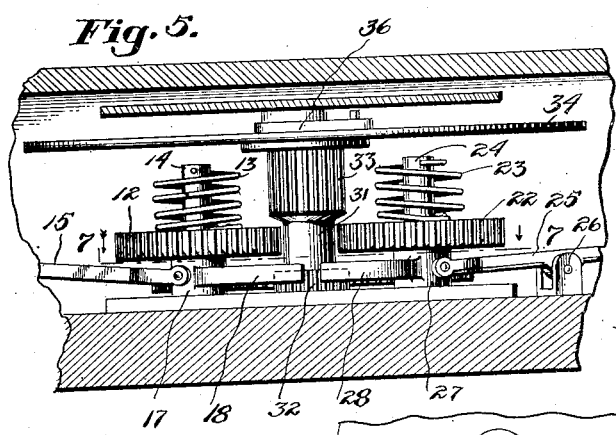
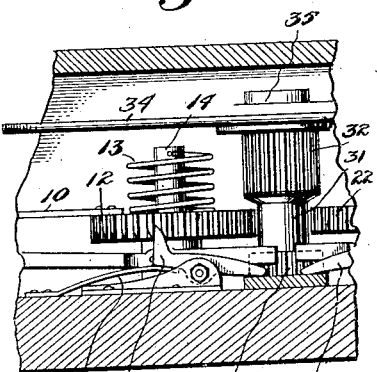
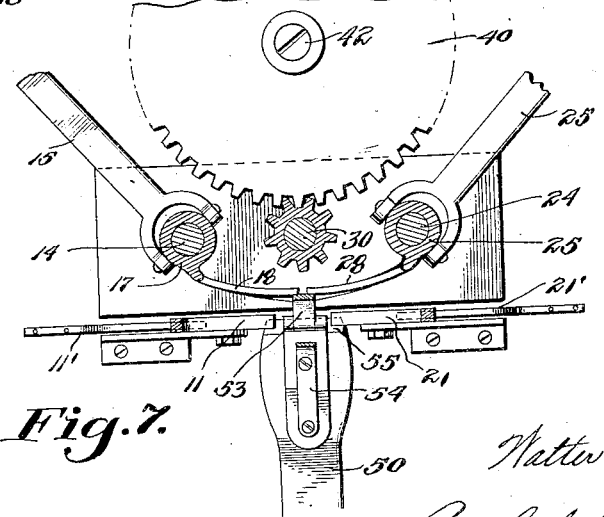
Inventor
Walter C. Fowler

UNITED STATES PATENT OFFICE.

WALTER C. FOWLER, OF TRENTON, NEW JERSEY.

REGISTER.

1,260,658.  Specification of Letters Patent.  Patented Mar. 26, 1918.

Application filed December 1, 1917.  Serial No. 204,874.

*To all whom it may concern:*

Be it known that I, WALTER C. FOWLER, a citizen of the United States, residing in the city of Trenton, county of Mercer, State of New Jersey, have invented certain new and useful Improvements in Registers; and I do hereby declare the following to be a full, clear, and exact description of the invention, such as will enable others skilled in the art to which it appertains to make and use the same.

The invention relates to certain new and useful improvements in registers, and more particularly to registers or indicators for keeping the score or tally made by individuals in certain games, the apparatus being so constructed and arranged as to admit of each increment to the score being indicated, as by means of a manually set hand or pointer coöperating with a numbered scale, and each decrement or deduction from the score being indicated by a similar pointer and scale, the indicating means being associated with suitable counter disks, which, when the indicating hands are returned to zero by suitable trip mechanism, are operated to show the summation or total of the score, represented by the number of positive points less the number of negative points or deductions, the apparatus being provided with a zero setting device, which when operated, serves to return the primary indicating pointers and also the indicating disks or dials to zero position, so that the apparatus is ready for a subsequent game or registering operation.

In the accompanying drawing,

Fig. 4 is a detail of the transfer mechanism between the units and tens indicating disks.

Figs. 5 and 6 are fragmentary vertical sectional elevations at right angles to that shown in Fig. 3.

Fig. 7 is an enlarged plan view, partly in section, illustrating the arrangement of the re-setting mechanism.

Figure 1:
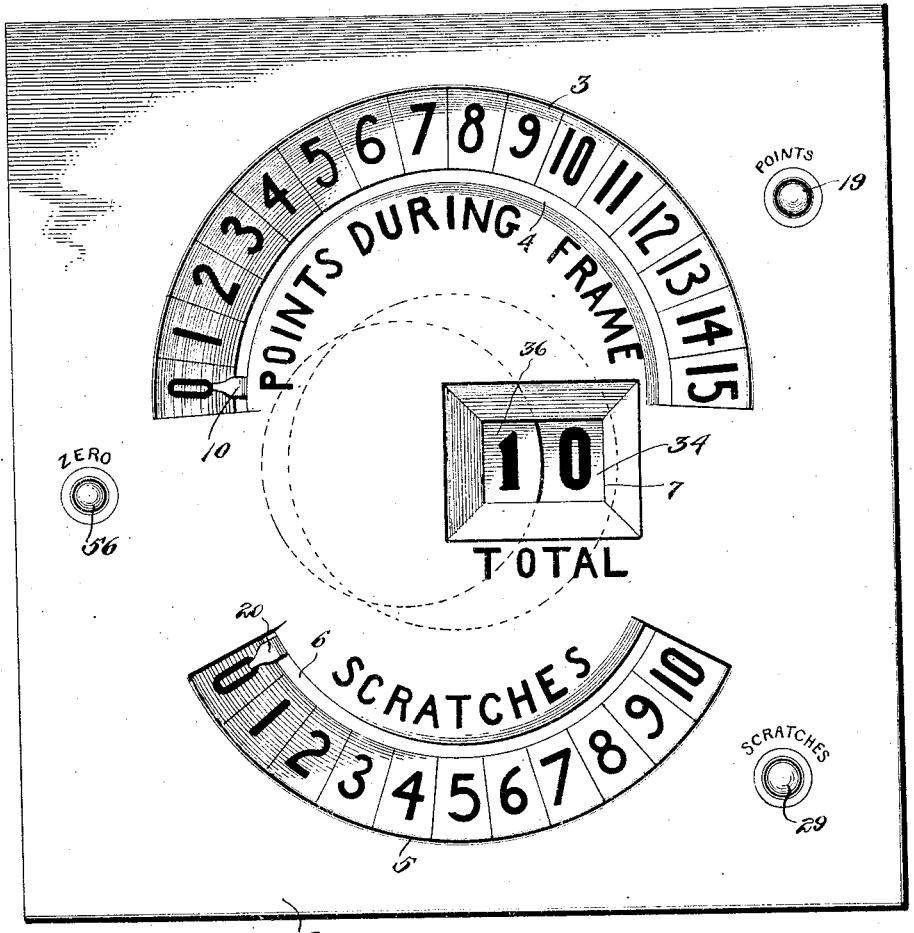
Figure 1 is a vertical elevation of a simple form of the apparatus designed as a register or counter for the game of pool or pocket billiards.
Figures 8, 9:
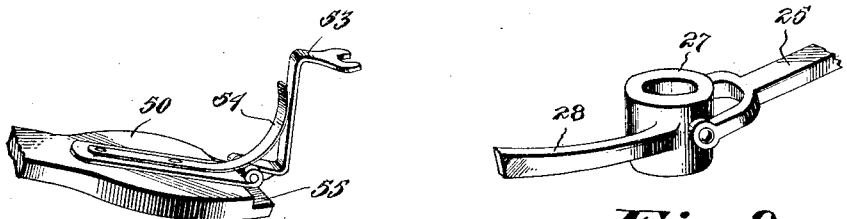
Figs. 8 and 9 are perspective views of structural details of the resetting mechanisms.
Figure 2:
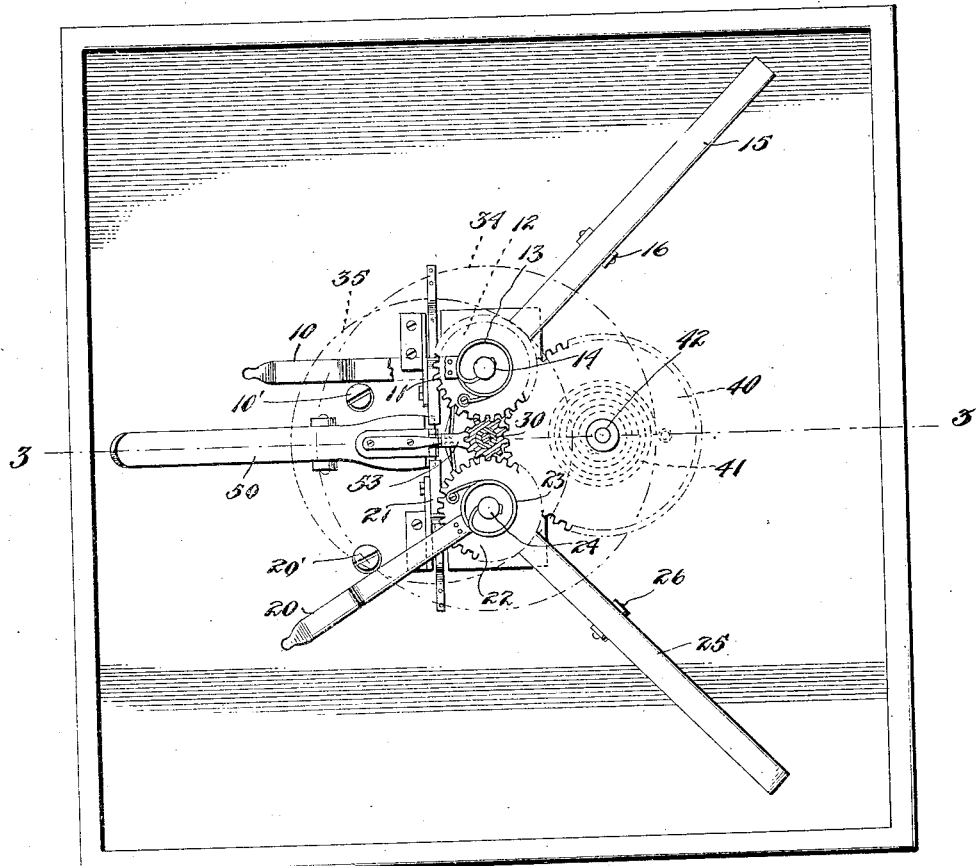
Fig. 2 is a plan view of the apparatus with the cover removed.

Referring to the drawings, the numeral 1 indicates a box-like casing, adapted to be attached to a wall or other support, and provided with a cover 2 having thereon two arcuate scales 3 and 5 along the interior edges of which are arc-shaped slots 4 and 6, respectively. Toward the center of the cover, and between the scales 3 and 5, is an opening 7 which constitutes the sight opening for the counter disks or dials of the register. In the particular form of the device shown, the upper scale is numbered from zero to fifteen, which represents the number of points possible in a frame of pool or pocket billiards. The lower scale is provided with numerals from zero to ten and indicates the number of scratches or points to be deducted from the score. It will be understood, however, that this particular application of the register is merely exemplary, and that the invention is adapted to be applied to indicate and register the successive points and the total number of points of any game or operation involving successive counts or tallies, which are subject to deductions by way of penalties or subtractions.

Passing through the slot 4 is a pointer 10, the free end of which is adapted to be engaged by the hand and moved into registry with the numbers on the scale 3. Said pointer 10 is rigidly attached to a gear wheel 12, slidably mounted upon a fixed post 14 secured to the base of the frame 1, and said wheel and pointer are normally subjected to the torsional strain of a helical spring 13 secured at one end to the upper face of the gear 12 and at the other to the fixed post 14. A suitable lug or post 10' secured to the bottom of the case serves as a stop to arrest the pointer 10 at zero position. The wheel 12 is provided with peripheral teeth, which serve both as gear teeth and as ratchet teeth, the lower ends of said teeth being beveled so that, when the gear 12 is moved in a clockwise direction by the pointer 10, the beveled ends of the teeth will ride over the beveled end of a locking pawl 11, pivoted to the base of the casing, and normally pressed into engagement with the teeth on the periphery of the gear 12 by means of a spring 11'.

Coöperating with the slot 6 is a corresponding pointer 20, which is secured to the upper face of the peripherally toothed wheel 22, generally similar to gear 12, which is slidably mounted on a stationary post 24, and subject to the tension of a helical spring 23 secured to the gear and post respectively, and normally tending to move the gear in anticlockwise direction, until the pointer 20 comes into engagement with a stop lug or post 20', which indicates the zero position of the said pointer. The peripheral teeth of the gear 22 are engaged by a pivoted pawl 21, similar in construction and operation to the pawl 11 and serving to hold the gear 22 and the pointer 20 attached thereto in any predetermined adjustment, as will be understood.

Disposed between the gears 12 and 22, and centrally within the casing 1 is a spindle 30 upon which is rotatably mounted a sleeve 31 provided with a lower gear member 32 and an upper gear member 33, between which gear members the gears 12 and 22 normally lie in horizontal alinement. Secured to the upper face of the sleeve 31 is a unit counter disk 34 having thereon index figures from zero to nine inclusive, adapted to show through the opening 7 in the face plate of the apparatus, as indicated in Fig. 1. Mounted above the unit disk 34 is a tens disk 35, which is supported by an angular bracket 38, rigidly secured to an appropriate part of the casing 1, and between the disks 34 and 35 is a suitable transfer mechanism, preferably in the form of an ordinary Geneva stop for carrying the indications from the unit to the tens disks, as will be understood. The relation of the units and tens disks, and the transfer mechanism is shown diagrammatically in Fig. 4.

The disk 34 is adapted to be rotated by the toothed gears 12 and 22 respectively, and when so rotated, serves together with the disk 35 to indicate the total number of points made in successive periods of play, less the number of penalties or scratches, and therefore the total score or tally by the player. In order to operate the disk 34 in one direction or the other, it is necessary that the gears 12 and 22 be moved into engagement with the upper gear member 33 of the sleeve 31, to effect this operation the gears 12 and 22 are mounted upon collar-like elements 17 and 27 respectively, which, in turn, are connected to levers 15 and 25 pivoted intermediate their lengths at points 16 and 26 respectively. The outer end of the lever 15 is connected to a push button 19 and similarly the outer end of the lever 25 is connected to the push button 29, both of which buttons project through openings in the face plate of the casing, as indicated in Fig. 1. The helical springs 13 and 23 normally force the gears 12 and 22 into their lower positions so that the peripheral teeth of the gears lie opposite the reduced portion in the sleeve 31 between the upper and lower gear members 32 and 33 thereon. When the lever member 15 is actuated by depressing the push button 19, the gear 12 is moved upward into mesh with the gear member 33, on the sleeve 31, and at the same time, said gear 12 is moved out of engagement with the pawl 11, so that the tension of spring 13 will be effective to turn gear 12 and rotate the same, together with gear 33, thereby rotating the disk 34. Similarly when the push button 29 is depressed, lever 25 is operated to lift gear 22 into engagement with gear section 33 on the sleeve 21, and the spring 23 tends to rotate the disk 34 in the opposite direction, the upward movement of said gear 22 by lever 25 clearing said gear from the pawl 21. It will be noted that the movement imparted to the disk 34 by gear 12 is in one direction, say clockwise, while the movement which gear 22 imparts to disk 34 is in the opposite or anti-clockwise direction, therefore the movement imparted to disk 34 by wheel 12 is cumulative or additive, while the movement imparted thereto by disk 22 is in the opposite direction and therefore subtractive.

Figure 3:
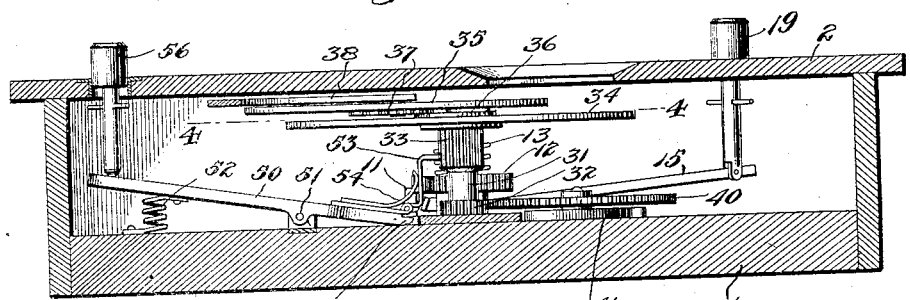
Fig. 3 is a transverse vertical section on line 3—3 of Fig. 2.

Mounted upon a central stud 42, at one side of the spindle 30 is a gear 40, meshing with the lower gear member 32 of the central sleeve 31, and said gear 40 is subject to the torsional effect of a helical spring 41, attached to the lower face of the gear 40 and to stationary spindle 42, respectively, so that the normal tendency of the spring 41 is to rotate gear 40 and sleeve 31 in a direction to return the counter disks 34 and 35 to zero position. In order to effect this latter operation, there is mounted on the bottom of the casing 1, at a point opposite the spring gear 40, a lever 50 pivoted at 51, having at its forward end a pivoted pawl 53, which normally engages the teeth on the gear member 33 of the sleeve 31, thereby serving to hold the register disks 34 and 35 against displacement and in the position to which they have been positively adjusted by the regular actuation of the register mechanism. Pawl 53 is yieldingly held in engagement with the teeth of gear 33 by means of a spring 54. Coöperating with the pawl 53 are two finger-like members 18 and 28 carried by the sleeves 17 and 27 by means of which the gears 12 and 22 are elevated into engagement with the gear member 33 on the sleeve 31. The rear end of the lever 50 is normally elevated by means of a spring 52, and is adapted to be depressed by means of push button 56, which projects through the face plate 2 of the device, as indicated in Figs. 1 and 3. The forward end of the lever 50 is provided with a shoulder 55, which underlies the ends of the pawls 11 and 21 respectively, so that when the lever 50 is depressed by push button 56, both of pawls 11 and 21 are rocked out of engagement with their coöperating gears 12 and 22, so that said gears and the pointers 10 and 20 attached thereto are free to return to zero position. This movement of the lever 50 also retracts pawl 53 from engagement with the teeth of the gear member 33, so that the spring 41 is free to drive gear 40, which in turn rotates the sleeve 31 and returns the counter disks 34 and 35 to zero position. It will thus be seen that when the zero push button 56 is depressed, the apparatus is restored to zero position, both as respects the pointers 10 and 20 and the register disks 34 and 35.

The operation of the apparatus as described is as follows: As the player scores successive points during the progress of the game, he moves the pointer 10 to successive numbers on the scale 3. Similarly, as the player incurs penalties, such as scratches in the game of pocket billiards, he moves the pointer 20 to an appropriate number on the scale 5. After he has completed his play, the pointer 10 will indicate the number of points scored and the pointer 20 the number of penalties incurred. He then depresses push button 19 which rocks lever 15 and lifts gear 12 to engage the teeth thereof with gear 33 on sleeve 31 and at the same time, disengages the teeth of gear 12 from pawl 11, and causes arm 18 to move pawl 53 out of engagement with gear 33. The spring 13 rotates gear 12 until pointer 10 strikes the post 10'. The movement of gear 12 rotates gear 33 a corresponding number of teeth and with it the register disk 34. After the push button 19 is released, the spring 13 forces gear 12 downward out of engagement with gear 33 and into engagement with pawl 11. The player then depresses push button 29 which actuates lever 25 to lift gear 22 causing the teeth on the latter to mesh with the teeth on gear 33 and releasing gear 22 from pawl 21, and retracting pawl 53 by means of arm 28, so that the spring 23 rotates gear 22 and with it gear 33 and disk 34, the rotation of said disk being in a direction opposite to that imparted by gear 12. When the push button 29 is released, the spring 23 moves gear 22 downward, and this portion of the apparatus is restored to normal position. Assume that the player makes a run of five balls in his first period of play, he moves the pointer 10 successively to the points 1 to 5 on scale 3. If during this period of play he makes two scratches, he moves the pointer 20 successively to points 1 and 2 on scale 6. When he has finished his first period of play, he depresses push buttons 19 and 29 successively. The operation of the first push button will cause the pointer 10 to return to zero position and the register disk 34 to show 5 under the sight opening 7. When he then presses push button 29 the pointer 20 returns to zero and the register disk 34 moves backward two numbers so that the numeral 3 will show in the sight opening 7, indicating the total number of points during the initial play, to wit five balls less two scratches, or a total of three points. If during his next period of play, the player scores say eight points and one scratch, he moves the pointer 10 from zero successively to a point over the eight division of the scale 3 and the pointer 20 over the one division of scale 6. When he has finished this period of play, he presses push buttons 19 and 29 successively, the operation of the first will be effective to restore pointer 10 to zero position and cause indicator disks 34 and 35 to be moved to indicate a total of 11 in the sight opening 7. He then depresses push button 29, and pointer 20 returns to zero and register disk 34 is moved backward one notch so that the number 10 indicating the total score appears in the sight opening. These operations are repeated until the game is finished, the total number of tallies and penalties for each period of play being indicated by the pointers 10 and 20 respectively, and the total number of points, represented by tallies less penalties, for all the periods of play, being indicated by the numbers on the register disks 34 and 35 appearing in the sight opening 7. After the game has been finished, the player depresses the zero button 56, which moves lever 50 downward, thereby retracting pawl 53 from engagement with gear 33, and similarly moving the pawls 11 and 21 out of engagement with the gears 12 and 22, thereby permitting the springs 13 and 23 to return the gears 12 and 22 and the pointers 10 and 20 to zero position and allowing the gear 40 under the action of spring 41 to rotate the register disks 34 and 35 in a reverse direction to zero position, so that the apparatus is ready for a subsequent scoring operation.

It will be noted that the movement of the pointers 10 and 20 in the scoring operation tends to wind up the springs 13 and 23, so that when the springs are released they properly return the pointers to zero position. Furthermore, when the gear 12 is in mesh with gear 33 to rotate the register disks 34 and 35, gear 32 on the lower part of the sleeve 31 rotates gear 40 in a direction to increase the tension of spring 41 so that the latter spring is always under sufficient tension to return the register disks to zero position when the apparatus is released by the actuation of the zero button 56. It will be understood, of course, that the gear 40 is provided with a suitable stop to arrest the gear at a point corresponding to the zero positions of the register disks 34 and 35

What I claim is:—

1. A counter comprising an indicator for showing a series of successive positive counts, a second indicator for showing one or more negative counts, means for returning said indicators to zero, a totalizing register, and means associated with said indicators and operated during the return movement thereof to actuate said totalizing register to show the result represented by the difference between the total positive and the total negative counts made by said indicators.

2. A counter comprising an indicator for showing a series of successive positive counts, a second indicator for showing one or more negative counts, means for returning said indicators to zero, a totalizing register, means associated with said indicators and operated during the return movement thereof to actuate said totalizing register to show the result represented by the difference between the total positive and the total negative counts made by said indicators, and a zero setting mechanism for the indicators and the register.

3. A counter comprising a positive count indicator including a rotary pointer and a numerical scale, a negative count indicator including a similar pointer and scale, spring-actuated gears connected to said pointers to be moved thereby, a totalizing register normally independent of said indicators, and means to move said gears successively into engagement with a common gear of the register and to permit the gears to return to zero, whereby the register will be operated to show the total represented by the difference between the total positive and the total negative counts shown by said pointers.

4. A counter comprising a positive count indicator including a rotary pointer and a numerical scale, a negative count indicator including a similar pointer and scale, spring-actuated gears connected to said pointers to be moved thereby, a totalizing register normally independent of said indicators, means to move said gears successively into engagement with a common gear of the register and to permit the gears to return to zero, whereby the register will be operated to show the total represented by the difference between the total positive and the total negative counts shown by said pointers, and a zero setting mechanism for the indicators and the register.

5. A counter comprising two oppositely movable gears, means for moving each of said gears step by step and for indicating the extent of such movement, means for automatically returning said gears to zero position, a register normally independent of said gears and including a gear member adapted to be engaged by said gears, and means for moving said gears successively into engagement with the register gear member and releasing said gears to permit the return movement thereof, whereby the register is actuated to show the difference between the indicated movements of the oppositely movable gears.

6. A counter comprising two oppositely movable gears, means for moving each of said gears step by step and for indicating the extent of such movement, means for automatically returning said gears to zero position, a register normally independent of said gears and including a gear member adapted to be engaged by said gears, means for moving said gear successively into engagement with the register gear member and releasing said gears to permit the return movement thereof, whereby the register is actuated to show the difference between the indicated movements of the oppositely movable gears, and a zero setting mechanism for the indicators and the register.

7. A counter comprising two oppositely movable gears, posts upon which said gears are removably and slidably mounted, springs tending to force said gears downward and move them to zero position, means for moving each gear step by step against the tension of said springs and for indicating the extent of such movement, pawls for holding said gears in adjusted position, a register normally independent of said gears and including a gear member adapted to be engaged by said gears, and lever mechanism for lifting the respective gears to disengage the locking pawls and engage the gears successively with the register gear member, whereby the gears are returned to zero position and the register is actuated to show the difference between the indicated movements of the oppositely movable gears.

8. A counter comprising two oppositely movable gears, posts upon which said gears are removably and slidably mounted, springs tending to force said gears downward and move them to zero position, means for moving each gear step by step against the tension of said springs and for indicating the extent of such movement, pawls for holding said gears in adjusted position, a register normally independent of said gears and including a gear member adapted to be engaged by said gears, lever mechanism for lifting the respective gears to disengage the locking pawls and engage the gears successively with the register gear member, whereby the gears are returned to zero position and the register is actuated to show the difference between the indicated movements of the oppositely movable gears, and a zero setting mechanism for the indicators and the register.

In testimony whereof I affix my signature.

WALTER C. FOWLER.